US010629971B2

(12) United States Patent
Matsumoto et al.

(10) Patent No.: US 10,629,971 B2
(45) Date of Patent: Apr. 21, 2020

(54) FUEL CELL VEHICLE AND METHOD OF OPERATING THE SAME

(71) Applicant: HONDA MOTOR CO., LTD., Tokyo (JP)

(72) Inventors: Yuji Matsumoto, Wako (JP); Takuto Nakagawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 147 days.

(21) Appl. No.: 15/597,154

(22) Filed: May 17, 2017

(65) Prior Publication Data

US 2017/0355279 A1 Dec. 14, 2017

(30) Foreign Application Priority Data

Jun. 8, 2016 (JP) ................................ 2016-114078

(51) Int. Cl.
*H01M 8/04302* (2016.01)
*H01M 8/0438* (2016.01)
(Continued)

(52) U.S. Cl.
CPC ........... *H01M 16/006* (2013.01); *B60L 1/003* (2013.01); *B60L 15/2045* (2013.01); *B60L 58/25* (2019.02);
(Continued)

(58) Field of Classification Search
CPC ........................ H01M 16/006; H01M 8/04302
(Continued)

(56) References Cited

U.S. PATENT DOCUMENTS

2004/0219409 A1* 11/2004 Isogai ............... H01M 8/04007 429/435
2007/0292724 A1* 12/2007 Gilchrist ........... H01M 8/04268 429/9
(Continued)

FOREIGN PATENT DOCUMENTS

JP 09-231991 9/1997
JP 2003-168464 6/2003
(Continued)

OTHER PUBLICATIONS

Japanese Office Action for corresponding JP Application No. 2016-114078, dated Jan. 9, 2018 (w/ English machine translation).

*Primary Examiner* — Tae-Sik Kang
(74) *Attorney, Agent, or Firm* — Mori & Ward, LLP

(57) ABSTRACT

A fuel cell vehicle includes a fuel cell, a first electric component, a second electric component, a battery, a first switch, a second switch, and circuitry. The first electric component is to operate the fuel cell. The second electric component is not to be used to operate the fuel cell. The first switch is to electrically connect the first electric component to the battery to supply electric power from the battery to the first electric component. The second switch is to electrically connect the second electric component to the battery to supply electric power from the battery to the second electric component. The circuitry is configured to control the first switch to electrically connect the first electric component to the battery and to control the second switch not to electrically connect the second electric component to the battery when the fuel cell is started.

13 Claims, 5 Drawing Sheets

(51) Int. Cl.

| | |
|---|---|
| ***B60L 58/33*** | (2019.01) |
| ***H01M 16/00*** | (2006.01) |
| ***H01M 8/0432*** | (2016.01) |
| ***H01M 8/04828*** | (2016.01) |
| ***B60L 1/00*** | (2006.01) |
| ***B60L 15/20*** | (2006.01) |
| ***B60L 58/31*** | (2019.01) |
| ***B60L 58/34*** | (2019.01) |
| ***B60L 58/25*** | (2019.01) |
| ***B60L 58/40*** | (2019.01) |
| *H01M 10/48* | (2006.01) |

(52) U.S. Cl.

CPC ............... *B60L 58/31* (2019.02); *B60L 58/33* (2019.02); *B60L 58/34* (2019.02); *B60L 58/40* (2019.02); *H01M 8/0438* (2013.01); *H01M 8/04302* (2016.02); *H01M 8/04373* (2013.01); *H01M 8/04947* (2013.01); *B60L 2240/545* (2013.01); *B60L 2240/66* (2013.01); *B60L 2240/662* (2013.01); *H01M 10/486* (2013.01); *H01M 2250/20* (2013.01); *Y02T 10/645* (2013.01); *Y02T 10/705* (2013.01); *Y02T 10/72* (2013.01); *Y02T 10/7283* (2013.01); *Y02T 10/7291* (2013.01); *Y02T 90/16* (2013.01); *Y02T 90/32* (2013.01); *Y02T 90/34* (2013.01)

(58) Field of Classification Search

USPC .......................................................... 429/429

See application file for complete search history.

(56) References Cited

U.S. PATENT DOCUMENTS

2012/0270126 A1* 10/2012 Matsumoto ............. H01M 8/04 429/429

2017/0008420 A1* 1/2017 Kim .................... B60L 11/1892

FOREIGN PATENT DOCUMENTS

JP 2008-207577 9/2008

JP 2008-301542 12/2008

* cited by examiner

FUEL CELL VEHICLE AND METHOD OF OPERATING THE SAME

CROSS-REFERENCE TO RELATED APPLICATIONS

The present application claims priority under 35 U.S.C. § 119 to Japanese Patent Application No. 2016-114078, filed Jun. 8, 2016, entitled "Fuel Cell Vehicle and Method of Activating the Same." The contents of this application are incorporated herein by reference in their entirety.

BACKGROUND

1. Field

The present disclosure relates to a fuel cell vehicle and method of operating the same.

2. Description of the Related Art

For example, Japanese Unexamined Patent Application Publication No. 9-231991 discloses a technical idea of supplying power from a battery to a vehicle-driving motor when activating a fuel cell mounted on a fuel cell vehicle.

SUMMARY

According to one aspect of the present disclosure, a fuel cell vehicle includes a fuel cell, a first electric component, a second electric component, a battery, a first switch, a second switch, and circuitry. The first electric component is to operate the fuel cell. The second electric component is not to be used to operate the fuel cell. The first switch is to electrically connect the first electric component to the battery to supply electric power from the battery to the first electric component. The second switch is to electrically connect the second electric component to the battery to supply electric power from the battery to the second electric component. The circuitry is configured to control the first switch to electrically connect the first electric component to the battery and to control the second switch not to electrically connect the second electric component to the battery when the fuel cell is started.

According to another aspect of the present disclosure, a method of operating a fuel cell vehicle includes starting a fuel cell. A first switch is controlled to electrically connect a battery to a first electric component to supply electric power from the battery to the first electric component when the fuel cell is started. The first electric component is to operate the fuel cell. A second switch is controlled not to electrically connect a battery to a second electric component when the fuel cell is started. The second electric component is not to operate the fuel cell.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
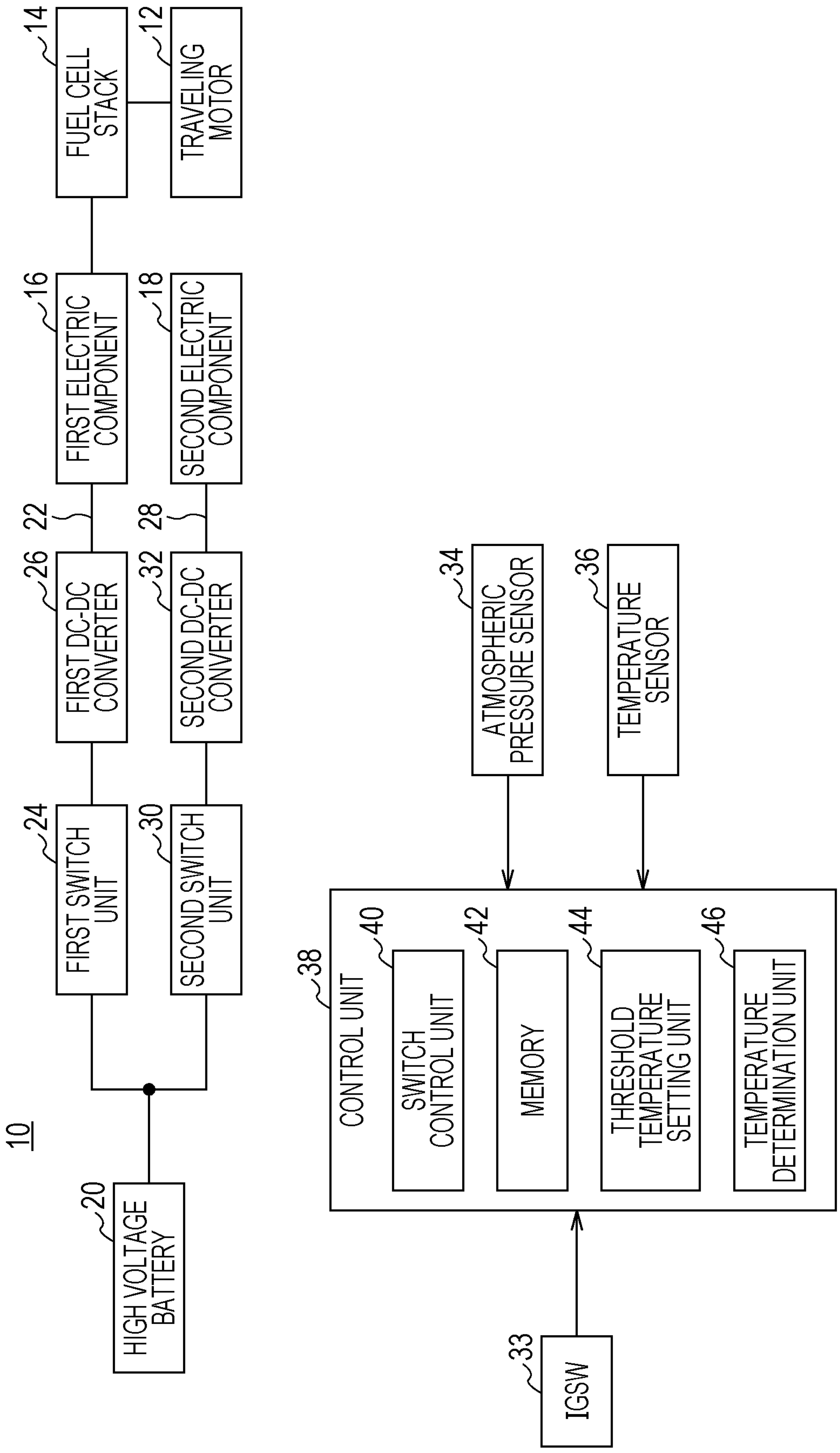
FIG. 1 is a block diagram of a fuel cell vehicle according to one embodiment of the present disclosure.

The embodiment(s) will now be described with reference to the accompanying drawings, wherein like reference numerals designate corresponding or identical elements throughout the various drawings.

Hereinafter, embodiments of a fuel cell vehicle and a method of activating the same according to the present disclosure are described with reference to the accompanying drawings.

As illustrated in FIG. 1, a fuel cell vehicle 10 according to the present embodiment includes a traveling motor 12 for driving wheels (not illustrated), a fuel cell stack (fuel cell) 14 for supplying power to the traveling motor 12, a first electric component 16 that is used to activate the fuel cell stack 14, a second electric component 18 that is not used to activate the fuel cell stack 14, and a high voltage battery 20 (secondary cell, storage battery) capable of supplying power to the first electric component 16 and the second electric component 18.

The traveling motor 12 is driven with power generated by the fuel cell stack 14, but also may be driven with power supplied from the high voltage battery 20. The fuel cell stack 14 generates power by an electrochemical reaction between hydrogen gas (fuel gas) supplied to an anode side of the fuel cell stack 14 and air (oxidant gas) supplied to a cathode side of the fuel cell stack 14.

The first electric component 16 is an electric apparatus necessary for activating the fuel cell stack 14. The first electric component 16 includes, for example, an air pump (oxidant gas supply pump) for supplying air to the cathode side of the fuel cell stack 14 and an air conditioning heater that may be used as a load having consuming much power when the fuel cell stack 14 is warmed up.

The second electric component 18 is an electric apparatus not necessary for activating the fuel cell stack 14. The second electric component 18 includes, for example, an audio apparatus, a navigation apparatus, a blower motor, an AC power supply, a seat heater apparatus, a steering heater apparatus, a mobile phone wireless charger, a head-up display apparatus (apparatus displaying a navigation guide or the like on a windshield), a mirror heater apparatus (mirror hot wire), and a rear glass heater apparatus (rear glass hot wire).

The high voltage battery 20 includes, for example, a lead battery, a nickel-cadmium battery, a nickel hydrogen battery, and a lithium ion battery. A first power path (first wiring) 22 that electrically couples the high voltage battery 20 and the first electric component 16 with each other is provided with a first switch unit 24 and a first DC-DC converter 26.

The first switch unit 24 is configured to be capable of switching the state of the first power path 22 between a coupled state and an uncoupled state. More specifically, when the first power path 22 is in the coupled state, the high voltage battery 20 and the first electric component 16 are electrically coupled with each other via the first power path 22. When the first power path 22 is in the uncoupled state, the high voltage battery 20 and the first electric component 16 are not electrically coupled with each other via the first power path 22.

The first switch unit 24 includes, for example, a switching element. The first DC-DC converter 26 converts (steps down) a voltage of the high voltage battery 20 to a voltage corresponding to the first electric component 16.

A second power path (second wiring) 28 that electrically couples the high voltage battery 20 and the second electric component 18 with each other is provided with a second switch unit 30 and a second DC-DC converter 32.

The second switch unit 30 is configured such that the second power path 28 may be switched to a coupled state or an uncoupled state. More specifically, when the second power path 28 is in the coupled state, the high voltage battery 20 and the second electric component 18 are electrically coupled with each other via the second power path 28. When the second power path 28 is in the uncoupled state, the high voltage battery 20 and the second electric component 18 are not electrically coupled with each other via the second power path 28.

The second switch unit 30 is configured in the same manner as the first switch unit 24. The second DC-DC converter 32 converts (steps down) a voltage of the high voltage battery 20 to a voltage corresponding to the second electric component 18. In the present embodiment, the voltage corresponding to the second electric component 18 is 12 V.

The fuel cell vehicle 10 further includes an ignition switch (IGSW 33) for activating the fuel cell vehicle 10, an atmospheric pressure sensor (atmospheric pressure acquisition unit) 34 for acquiring atmospheric pressure, a temperature sensor (temperature acquisition unit) 36 for acquiring temperature of the high voltage battery 20, and a control unit 38. An acquired value (acquired atmospheric pressure) of the atmospheric pressure sensor 34 and an acquired value (acquisition temperature T) of the temperature sensor 36 are transmitted to the control unit 38.

The control unit 38 is a known computer including an I/O interface and a processor (not illustrated). The control unit 38 serves as function implementing units by causing a processor to implement a program (not illustrated) stored in a memory 42.

The control unit 38 includes a switch control unit 40, a memory 42, a threshold temperature setting unit 44, and a temperature determining unit 46. The switch control unit 40 controls the first switch unit 24 to switch the state of the first power path 22 between the coupled state and uncoupled state. The switch control unit 40 controls the second switch unit 30 to switch the state of the second power path 28 between the coupled state and uncoupled state.

Figure 2:
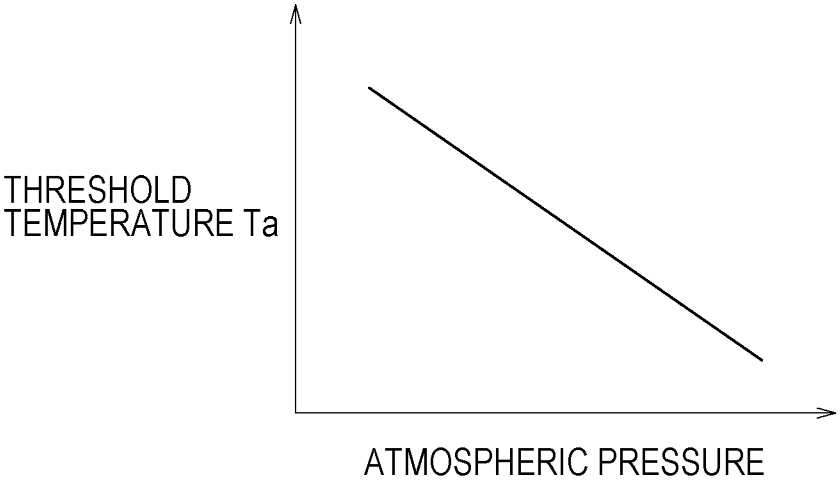
FIG. 2 is a graph illustrating a change of a threshold temperature relative to atmospheric pressure.

The memory 42 stores a graph such as illustrated in FIG. 2. The graph indicates a relationship between atmospheric pressure and threshold temperature Ta. According to the graph, the threshold temperature Ta becomes higher as atmospheric pressure becomes lower (as elevation becomes higher).

The threshold temperature setting unit 44 sets the threshold temperature Ta based on the acquired atmospheric pressure and the above graph. The graph used in the present embodiment is prepared such that when the acquired atmospheric pressure is 1 atm, the threshold temperature Ta becomes below the freezing point (0° C. or lower). In FIG. 1, the temperature determining unit 46 determines whether the acquisition temperature T is higher than the threshold temperature Ta.

The fuel cell vehicle 10 according to the present embodiment is basically configured as described above. Next, a method of activating the fuel cell vehicle 10 is described with reference to FIGS. 3 to 4B. When the ignition switch is in the off state, the first switch unit 24 and the second switch unit 30 are in the off state respectively. In other words, the first power path 22 and the second power path 28 are uncoupled respectively.

Figure 3:
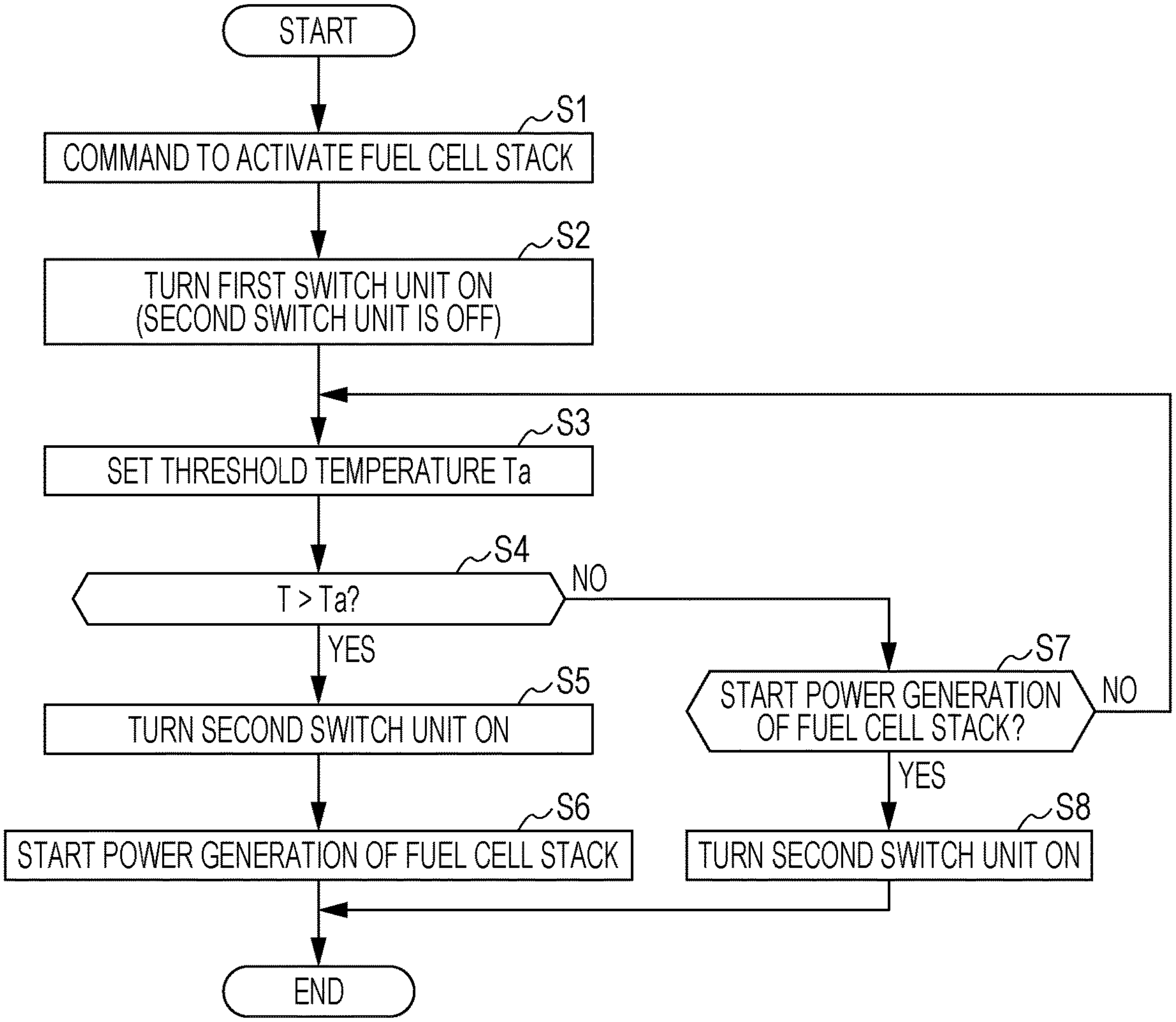
FIG. 3 is a flowchart illustrating a method of activating the fuel cell vehicle of FIG. 1.
Figure 4A:
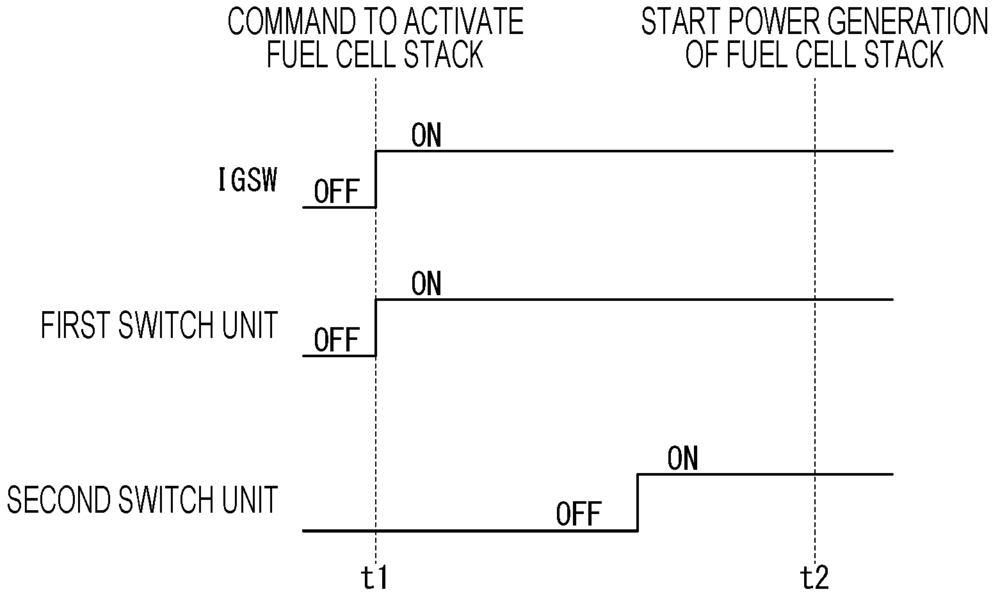
FIG. 4A is a first time chart of a first switch unit and a second switch unit.
Figure 4B:
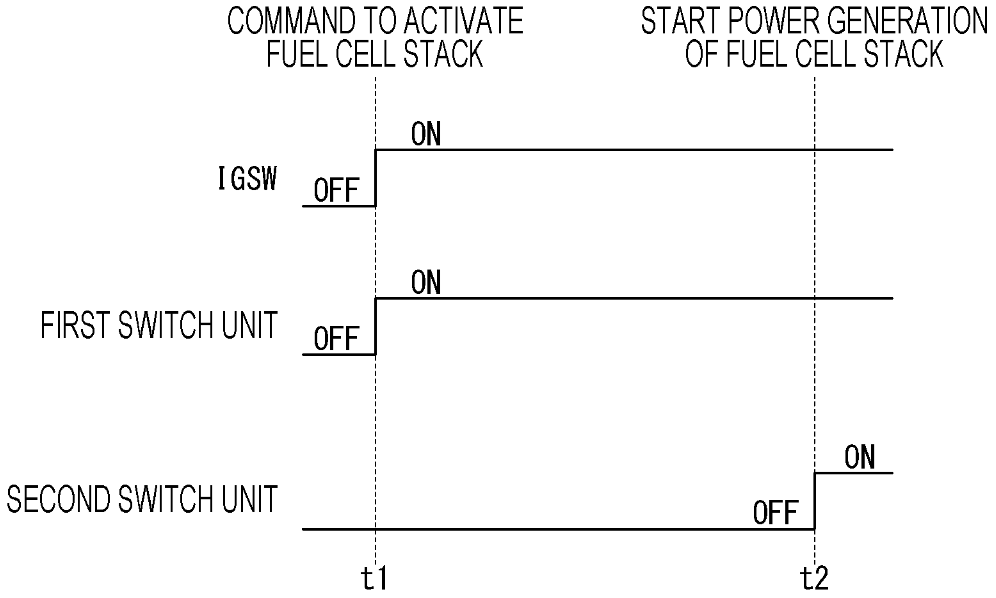
FIG. 4B is a second time chart of the first switch unit and the second switch unit.

In the present embodiment, for example, as illustrated in FIGS. 3 and 4A, when the IGSW 33 is turned on and thereby a command to activate the fuel cell stack 14 is issued (step S1 of FIG. 3), in step S2, the switch control unit 40 turns the first switch unit 24 on such that the first power path 22 is turned into the coupled state. Meanwhile, at that time, as the second switch unit 30 is off, the second power path 28 remains in the uncoupled state (see time t1 of FIG. 4A).

Thus, power supply from the high voltage battery 20 to the second electric component 18 via the second power path 28 is inhibited, and power is supplied from the high voltage battery 20 to the first electric component 16 via the first power path 22. Consequently, even in a low temperature environment or when charge amount of the high voltage battery 20 is relatively small, shortage of power supply from the high voltage battery 20 to the first electric component 16 may be suppressed.

When power is supplied from the high voltage battery 20 to the first electric component 16, for example, an air pump of the first electric component 16 is driven and a stop valve of a hydrogen tank is opened. Thus, supply of air to a cathode side of the fuel cell stack 14 is started, and supply of hydrogen gas to an anode side of the fuel cell stack 14 is started.

Next, in step S3, the threshold temperature setting unit 44 sets the threshold temperature Ta based on an acquired atmospheric pressure with reference to the graph illustrated in FIG. 2, the graph being stored in the memory 42. Then, in step S4, the temperature determining unit 46 determines whether temperature (acquisition temperature T) of the high voltage battery 20 is higher than the threshold temperature Ta.

When the temperature determining unit 46 determines that the acquisition temperature T is higher than the threshold temperature Ta (step S4: YES), in step S5, the switch control unit 40 turns the second switch unit 30 on such that the second power path 28 is turned into the coupled state.

Then, power is supplied from the high voltage battery 20 to the second electric component 18 via the second power path 28. Thus, an audio apparatus, a navigation apparatus, or the like may be activated.

Thereafter, in step S6, power generation is started by an electrochemical reaction between air supplied to the cathode side of the fuel cell stack 14 and hydrogen gas supplied to the anode side of the fuel cell stack 14 (see time t2 of FIG. 4A). At this stage, the flowchart ends.

On the other hand, when the temperature determining unit 46 determines that the acquisition temperature T is equal to or lower than the threshold temperature Ta (step S4: NO), in step S7, the control unit 38 determines whether power generation of the fuel cell stack 14 is started. When the control unit 38 determines that power generation of the fuel cell stack 14 is not started (step S7: NO), steps following step S3 are performed.

When the control unit 38 determines that power generation of the fuel cell stack 14 is started (step S7: YES), the switch control unit 40 turns the second switch unit 30 on such that the second power path 28 is turned into the coupled state (see time t2 of FIG. 4B). Thus, when both power of the high voltage battery 20 and power generated by the fuel cell stack 14 are available, the second electric component 18 may be used. At this stage, the flowchart ends.

Next, the fuel cell vehicle 10 according to the present embodiment is further described with reference to FIG. 5. A graph of FIG. 5 indicates a relationship between output power and power consumption of the high voltage battery 20 when the fuel cell stack 14 is activated in a low temperature environment (for example, at a temperature below the freezing point).

Figure 5:
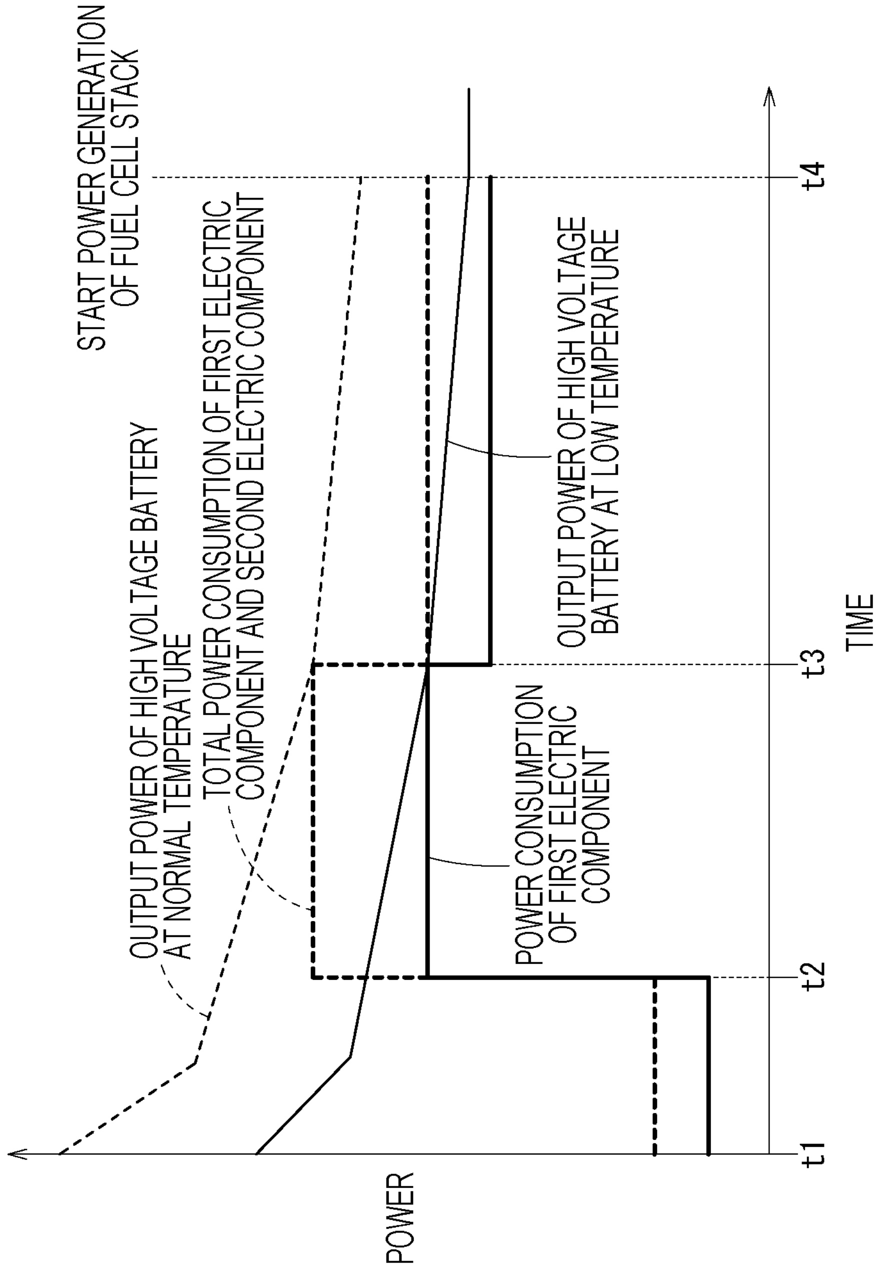
FIG. 5 is a graph indicating a relationship between output power and power consumption of a high voltage battery when activating the fuel cell stack in a low temperature environment.

In FIG. 5, total power consumption including power consumption of the first electric component 16 plus power consumption of the second electric component 18 is highest in a period between the time t2 and the time t3. This is because high power consumption is required to keep the rotation speed of the air pump shaft of the first electric component 16 constant.

When attempting to activate the fuel cell vehicle 10 in a low temperature environment (for example, at a temperature below the freezing point), power consumption of the first electric component 16 increases and output power of the high voltage battery 20 decreases as compared with normal temperature. For this reason, in a low temperature environment, output power of the high voltage battery 20 may become lower than total power consumption of the first electric component 16 and the second electric component 18 in a range between the time t2 and the time t4, as illustrated in FIG. 5.

However, according to the present embodiment, when a command to activate the fuel cell stack 14 is acquired, power supply from the high voltage battery 20 to the second electric component 18 that is not used to activate the fuel cell stack 14 is inhibited, and power is supplied from the high voltage battery 20 to the first electric component 16.

Namely, in the present embodiment, power consumption for activation of the fuel cell stack 14 may be suppressed to power consumption of the first electric component 16. Namely, in a low temperature environment, output power of the high voltage battery 20 is higher than power consumption of the first electric component 16 in a range from the time t1 to the time t4. More specifically, in a low temperature environment, shortage of power supply from the high voltage battery 20 to the first electric component 16 may be suppressed, and thereby the fuel cell stack 14 may be activated in a reliable and quick manner.

When temperature (acquisition temperature T) of the high voltage battery 20 is higher than the threshold temperature Ta (step S4: YES), the second switch unit 30 is turned on such that the second power path 28 is turned into the coupled state (see step S5). Namely, when shortage of power supply from the high voltage battery 20 to the first electric component 16 is unlikely to occur as temperature of the high voltage battery 20 is relatively high, power supply from the high voltage battery 20 to the second electric component 18 becomes possible at an early stage. Thus, product performance of the fuel cell vehicle 10 may be improved.

Further, when the acquisition temperature T is equal to or lower than the threshold temperature Ta (step S4: NO), the second switch unit 30 is turned on when starting power generation of the fuel cell stack 14 such that the second power path 28 is turned into the coupled state (see steps S7 and S8). Namely, when shortage of power supply from the high voltage battery 20 to the first electric component 16 is likely to occur due to a relatively low temperature (for example, below the freezing point) of the high voltage battery 20, power supply from the high voltage battery 20 to the second electric component 18 becomes possible from the time when starting power generation of the fuel cell stack 14. Thus, the fuel cell stack 14 may be activated in a reliable and quick manner, and product performance of the fuel cell vehicle 10 may be improved.

When atmospheric pressure is relatively low (when elevation is relatively high), power consumption of the air pump necessary to activate the fuel cell stack 14 becomes high. However, in the present embodiment, the threshold temperature Ta is set to be higher as atmospheric pressure becomes lower. Thus, shortage of power supply from the high voltage battery 20 to the first electric component 16 may be suppressed in an effective manner.

Although the fuel cell vehicle and the method of activating the same according to the present disclosure are applied to the embodiments described above, it is obvious that various configurations may be adopted without deviating from the spirit of the present disclosure.

According to one aspect of the present disclosure, a fuel cell vehicle includes a fuel cell, a first electric component that is used to activate the fuel cell, a second electric component that is not used to activate the fuel cell, a battery capable of supplying power to the first electric component and the second electric component a first switch unit capable of switching a state of a first power path that is capable of electrically coupling the battery and the first electric component with each other, between a coupled state and an uncoupled state, a second switch unit capable of switching a state of a second power path that is capable of electrically coupling the battery and the second electric component with each other, between a coupled state and an uncoupled state, and a switch control unit configured to control the first switch unit and the second switch unit. Here, upon acquiring a command to activate the fuel cell, the switch control unit controls the first switch unit such that the first power path is turned into the coupled state, and controls the second switch unit such that the second power path is turned into the uncoupled state.

The fuel cell vehicle according to the present disclosure is configured such that when a command to activate the fuel cell is acquired, power supply from the battery to the second electric component that is not used to activate the fuel cell is inhibited, and power is supplied from the battery to the first electric component. Thus, in a low temperature environment, shortage of power supply from the battery to the first electric component may be suppressed, and the fuel cell may be activated in a reliable and quick manner.

In the first aspect of the present disclosure, the fuel cell vehicle may further include a temperature acquisition unit configured to acquire temperature of the battery, and a temperature determining unit configured to determine whether acquisition temperature acquired by the temperature acquisition unit is higher than a threshold temperature. Here, when the temperature determining unit determines that the acquisition temperature is higher than the threshold temperature, the switch control unit may control the second switch unit such that the second power path is turned into the coupled state.

With such a configuration, when shortage of power supply from the battery to the first electric component is unlikely to occur as battery temperature is relatively high, power supply from the battery to the second electric component becomes possible at a relatively early stage. Thus, product performance of the fuel cell vehicle may be improved.

In the first aspect of the present disclosure, when the temperature determining unit determines that the acquisition temperature is equal to or lower than the threshold temperature, the switch control unit may control the second switch unit such that the second power path is turned into the coupled state when starting power generation of the fuel cell.

With such a configuration, when shortage of power supply from the battery to the first electric component is likely to occur due to a relatively low temperature of the battery, power supply from the battery to the second electric component becomes possible from a time when starting power generation of the fuel cell. Thus, the fuel cell may be activated in a reliable and quick manner, and product performance of the fuel cell vehicle may be improved.

In the first aspect of the present disclosure, the fuel cell vehicle further may include an atmospheric pressure acquisition unit configured to acquire atmospheric pressure and, a threshold temperature setting unit configured to set the threshold temperature higher as atmospheric pressure acquired by the atmospheric pressure acquisition unit is lower.

With such a configuration, even when power consumption of the first electric component increases due to a relatively low atmospheric pressure (relatively high elevation), the threshold temperature is set higher and thereby shortage of power supply from the battery to the first electric component may be suppressed in an effective manner.

According to another aspect of the present disclosure, a method of activating a fuel cell vehicle including a fuel cell, a first electric component that is used to activate the fuel cell, a second electric component that is not used to activate the fuel cell, a battery capable of supplying power to the first electric component and the second electric component, a first switch unit capable of switching a state of a first power path that is capable of electrically coupling the battery and the first electric component with each other, between a coupled state and an uncoupled state, and a second switch unit capable of switching a state of a second power path that is capable of electrically coupling the battery and the second electric component with each other, between a coupled state and an uncoupled state, the method including when a command to activate the fuel cell is acquired, causing the first switch unit to turn the first power path into the coupled state, and causing the second switch unit to turn the second power path into the uncoupled state.

A method of activating the fuel cell vehicle according to the present disclosure exhibits the similar operation effect as the fuel cell vehicle described above.

In the second aspect of the present disclosure, the method of activating a fuel cell vehicle may further include, when an acquisition temperature of the battery acquired by a temperature acquisition unit is higher than a threshold temperature, causing the second switch unit to turn the second power path into the coupled state.

In the second aspect of the present disclosure, the method of activating a fuel cell vehicle may further include, when the acquisition temperature is equal to or lower than the threshold temperature, causing the second switch unit to turn the second power path into the coupled state when starting power generation of the fuel cell.

In the second aspect of the present disclosure, the method of activating a fuel cell vehicle may further include setting the threshold temperature higher as atmospheric pressure acquired by an atmospheric pressure acquisition unit is lower.

According to the present disclosure, when a command to activate the fuel cell is acquired, power supply from the battery to the second electric component is inhibited, and power is supplied from the battery to the first electric component. Thus, the fuel cell may be activated in a reliable and quick manner in a low temperature environment.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel cell vehicle comprising:

a fuel cell;

a first electric component to operate the fuel cell, the first electric component is at least one of an air pump configured to supply air to the fuel cell and an air conditioning heater;

a second electric component not to be used to operate the fuel cell;

a battery;

a first switch to electrically connect the first electric component to the battery to supply electric power from the battery to the first electric component;

a second switch to electrically connect the second electric component to the battery to supply electric power from the battery to the second electric component;

a temperature sensor to detect temperature of the battery; and circuitry configured to control the first switch to electrically connect the first electric component to the battery and to:

control the second switch not to electrically connect the second electric component to the battery prior to starting of power generation of the fuel cell when the temperature of the battery detected by the temperature sensor is equal to or lower than a threshold temperature; and control the second switch to electrically connect the second electric component to the battery prior to starting of power generation of the fuel cell when the temperature of the battery detected by the temperature sensor is higher than the threshold temperature.

2. The fuel cell vehicle according to claim 1, wherein when the temperature sensor determines that the temperature of the battery detected by the temperature sensor is equal to or lower than the threshold temperature, the circuitry controls the second switch unit to electrically connect the second electric component to the battery when power generation of the fuel cell is started.

3. The fuel cell vehicle according to claim 1, further comprising:

an atmospheric pressure sensor to detect atmospheric pressure, wherein the circuitry is further configured to increase the threshold temperature as the atmospheric pressure detected by the atmospheric pressure sensor decreases, and to decrease the threshold temperature as the atmospheric pressure detected by the atmospheric pressure sensor increases.

4. A method of operating a fuel cell vehicle, comprising:

detecting a temperature of a battery;

controlling a first switch to electrically connect the battery to a first electric component to supply electric power from the battery to the first electric component when a fuel cell is started, the first electric component being to operate the fuel cell wherein the first electric component is at least one of an air pump configured to supply air to the fuel cell and an air conditioning heater;

controlling a second switch not to electrically connect the battery to a second electric component prior to starting of power generation of the fuel cell when the temperature of the battery is equal to or lower than a threshold temperature, the second electric component being not to operate the fuel cell.

5. The method according to claim 4, further comprising: controlling the second switch to electrically connect the battery to the second electric component when the temperature of the battery is higher than the threshold temperature.

6. The method according to claim 4, further comprising: controlling the second switch to electrically connect the battery to the second electric component when power generation of the fuel cell is started when the temperature of the battery is equal to or lower than the threshold temperature.

7. The method according to claim 5, further comprising: detecting atmosphere pressure; and increasing the threshold temperature as the atmospheric pressure detected by the atmospheric pressure sensor decreases, and decreasing the threshold temperature as the atmospheric pressure detected by the atmospheric pressure sensor increases.

8. The method according to claim 4, wherein the first electric component is the air pump configured to supply air to the fuel cell.

9. The method according to claim 4, wherein the first electric component is the air conditioning heater.

10. The method according to claim 4, further comprising: controlling the second switch to electrically connect the second electric component to the battery prior to starting of the power generation of the fuel cell when the temperature of the battery detected by the temperature sensor is higher than the threshold temperature.

11. A fuel cell vehicle comprising:

a fuel cell;

a first electric component to operate the fuel cell wherein the first electric component is at least one of an air pump configured to supply air to the fuel cell and an air conditioning heater;

a second electric component not to be used to operate the fuel cell;

a battery;

a first switch to electrically connect the first electric component to the battery to supply electric power from the battery to the first electric component;

a second switch to electrically connect the second electric component to the battery to supply electric power from the battery to the second electric component;

circuitry configured to control the first switch to electrically connect the first electric component to the battery and to control the second switch not to electrically connect the second electric component to the battery when the fuel cell is started;

a temperature sensor to detect temperature of the battery; and an atmospheric pressure sensor to detect atmospheric pressure, wherein the circuitry is further configured to determine whether the temperature of the battery detected by the temperature sensor is higher than a threshold temperature and to control the second switch to electrically connect the second electric component to the battery when the circuitry determines that the temperature of the battery detected by the temperature sensor is higher than the threshold temperature, and wherein the circuitry is further configured to increase the threshold temperature as the atmospheric pressure detected by the atmospheric pressure sensor decreases, and to decrease the threshold temperature as the atmospheric pressure detected by the atmospheric pressure sensor increases.

12. The fuel cell vehicle according to claim 11, wherein the first electric component is the air pump configured to supply air to the fuel cell.

13. The fuel cell vehicle according to claim 11, wherein the first electric component is the air conditioning heater.

* * * * *